United States Patent [19]

Thirion de Briel

[11] Patent Number: 4,564,357
[45] Date of Patent: Jan. 14, 1986

[54] PULLEY ASSEMBLY

[75] Inventor: Jacques Thirion de Briel, Levallois-Perret, France

[73] Assignee: Valeo, Paris, France

[21] Appl. No.: 401,333

[22] Filed: Jul. 23, 1982

[30] Foreign Application Priority Data

Jul. 31, 1981 [FR] France .................... 81 14925

[51] Int. Cl.$^4$ ............................. F16H 11/06
[52] U.S. Cl. ............................. 474/14; 474/8
[58] Field of Search .............. 474/8, 14, 15, 37, 38, 474/46

[56] References Cited

U.S. PATENT DOCUMENTS

| | | |
|---|---|---|
| 3,750,486 | 8/1973 | Belanger .................... 474/14 |
| 3,958,461 | 5/1976 | Aaen et al. .................. 474/14 |

*Primary Examiner*—James A. Leppink
*Assistant Examiner*—Frank McKenzie

*Attorney, Agent, or Firm*—Charles A. Brown; Charles E. Brown

[57] ABSTRACT

A pulley comprises two flanges. One is a fixed flange and the other is movable axially between two extreme positions, an advanced position and a retracted position. Between the two flanges is a variable transmission device such as a belt, for example. This is in contact with both flanges and is mounted so as to be movable radially relative to the flanges. With the movable flange are associated disengagable retaining means able to hold it temporarily and in a controlled manner in its retracted position. Also associated with the movable flange are control means adapted to release it. The disengagable retaining means are on the side of the extreme position of the movable flange opposite the position it occupies in the unoperated configuration. The pulley assembly is applicable to variable transmission drive systems, and in particular to variable transmission drive systems for automobile vehicles.

28 Claims, 13 Drawing Figures

PULLEY ASSEMBLY

BACKGROUND OF THE INVENTION

1. Field of the Invention

The present invention is generally concerned with pulley assemblies of the kind comprising a rotatable shaft, two flanges keyed to said shaft so as to rotate therewith, and a variable transmission device disposed axially between and in contact with said flanges and able to move radially relative thereto, one of said flanges, hereinafter referred to as the mobile flange, being mounted so as to move axially relative to said shaft between two extreme positions, namely a retracted position and an advanced position.

2. Description of the prior art

This type of pulley is usually employed, for example, in a variable transmission drive system.

The variable transmission device is then in practice a belt passing in an endless loop around two pulleys, the shaft of one of which forms the driving input member of the assembly whereas the shaft of the other forms the driven output member.

Variable transmission drive systems comprising such pulley assemblies are intended in particular for equipping automobile vehicles, for the purpose of driving ancillary devices such as the alternator, water pump, air conditioning plant and the like.

They provide, to at least a certain extent, for regulating the speed at which these ancillary devices are driven so as to be independent of the rotation speed of the motor: on starting the motor the mobile flange of the driving pulley is in the advanced position whereas that of the driven pulley is in the retracted position. The pulleys then provide a first and relatively high transmission ratio, of the order of 1.3:1, for example. When the motor has run up to its normal rotation speed the reverse arrangement is established and the pulleys then provide a relatively low transmission ratio, of the order of 0.6:1, for example.

The present invention is more particularly, but not exclusively, concerned with the case in which the changeover from one transmission ratio to the other is effected automatically, in response to centrifugal force.

For example, the mobile flange of the pulleys may be urged towards the other flange by diaphragm spring type elastic means, that is to say by elastic means comprising a circumferentially continuous peripheral part forming a Belleville washer and bearing on the mobile flange, and a central part subdivided into radial fingers bearing on a support member fixed in the axial direction relative to the shaft of the pulley assembly, these elastic means being acted on by flyweights which are responsive to centrifugal force and modify the loading applied in accordance with the speed of rotation.

There are then three consecutive phases of operation to be considered.

On starting, the flyweights are initially without significant effect. During this first phase of operation the variable transmission drive system provides a fixed transmission ratio and this is the highest transmission ratio.

Then, during a second phase of operation which begins when the flyweights begin to have some effect, it provides a variable transmission ratio which progressively decreases.

Finally, in a third phase of operation, the flyweights are rendered inoperative and the variable transmission drive system again provides a fixed transmission ratio, and this is the lowest transmission ratio.

Although such an arrangement has given and can continue to give satisfaction, it has the disadvantage that it is not necessarily adapted to present requirements.

It systematically imposes a high transmission ratio on the variable transmission drive system when the motor driving it is idling.

It is not necessarily certain that the ancillary devices driven need to be driven at full speed at this time, however.

In the case of the alternator, for example, such "forced" operation is in practice beneficial only when the load on the accumular battery is high for other reasons, for example due to the simultaneous use of main beam or dipped headlights, a demister and/or an electric window actuator.

It is not necessary in order to maintain the accumulator battery charged under normal conditions, however.

Apart from the excessive and unnecessary fatigue of the ancillary devices which results, the "forced" driving of these devices due to a high transmission ratio of the variable transmission drive system controlling them gives rise to a wasteful consumption of energy.

A general objective of the present invention is to provide a device enabling this disadvantage to be overcome and thus enabling energy to be saved.

SUMMARY OF THE INVENTION

A pulley assembly suitable for use in a variable transmission drive system for an automobile vehicle, comprising a rotatable shaft, two flanges keyed to said shaft so as to rotate therewith, at least a first of said flanges being mounted so as to move axially relative to said shaft between two extreme positions, namely a retracted position and an advanced position, a variable transmission device disposed axially between and in contact with said flanges and able to move radially relative thereto, disengagable retaining or locking means associated with said first flange and adapted to maintain it temporarily and in a controlled manner in one of its extreme positions, and control means associated with said first flange and adapted to release it, said retaining means being on the side of said extreme position of said first flange opposite that occupied by the latter when unoperated, so that they act only after a first movement of said first flange from one of its extreme positions to the other.

In practice, in the case of a pulley assembly of which the shaft is the driving shaft, the retaining means are on the side of the retracted position of the mobile flange which corresponds to the lowest transmission ratio when, as previously mentioned, the pulley assembly concerned forms part of a variable transmission drive system equipping an automobile vehicle.

They generally comprise at least one transverse retaining shoulder formed transversely for this purpose on a member constrained to move axially with the mobile flange and a transverse abutment shoulder formed transversely on a retractable abutment member mounted so as to be mobile between a retaining position, in which its transverse abutment shoulder is disposed axially short of said transverse retaining shoulder relative to the concerned extreme position of the mobile flange and therefore interferes with the path of axial movement of the transverse retaining shoulder when said mobile flange moves from this extreme position to the other, and a release position in which said transverse abutment shoulder is away from said path of movement, said retractable abutment member being acted on by return means which urge it continuously towards its retaining position.

In practice, there are several abutment members regularly spaced in the circumferential direction and attached to a support disk disposed transversely relative to the axis of the pulley assembly and rotatable about this axis from an abutment extreme position in which it bears in the circumferential direction against a stop, said support disk being acted on by return means which urge it continuously towards said abutment extreme position.

For example, each abutment member may be formed by a lug extending radially towards the axis of the pulley assembly and fastened to the support disk, being integral therewith, for example, disengagement thereof from its retaining position to its release position relative to the transverse retaining shoulder associated therewith occurring circumferentially when, by rotation, said support disk moves away from its abutment extreme position.

As a variant, each abutment member may consist of a lever mounted to pivot on the support disk about an axis parallel to the axis of the pulley assembly and associated with a cam able to displace it from its retaining position to its release position when said support disk moves away from its abutment extreme position, so that its disengagement relative to the associated transverse retaining shoulder occurs radially.

Be this as it may, in accordance with the invention by virtue of the transverse retaining shoulder with which it is constrained to move in the axial direction, and which may be circumferentially continuous or subdivided, the mobile flange snaps of its own accord onto the associated abutment member or members as soon as it reaches the corresponding extreme position, which is in practice the retracted position in the case under consideration, remaining so retained irrespective of subsequent changes in the rotation speed of the motor.

Consequently, the transmission ratio is maintained at the lowest value.

Should the need arise, however, should the accumulator battery be subjected to a significant current demand by virtue of an overload, for example, the control means associated with the retaining means in accordance with the invention come into action, for example in response to an excitation voltage supplied to them for this purpose when a defined threshold is exceeded, such as a temperature threshold in the cooling circuit, a discharge threshold for the accumulator battery, a pressure threshold for the hydraulic pump, etc. They then release the mobile flange concerned.

For example, these retaining means may comprise a brake disk with which the support disk of the stop member or members is constrained to rotate and with which are associated controlled braking means adapted to receive the corresponding excitation voltage.

When an excitation voltage is applied to these braking means they apply in their turn to the brake disk a braking torque as a result of which the support disk of the stop member or members, which is constrained to rotate with the brake disk, moves away from its abutment extreme position with the consequence that, as previously mentioned, the or each stop member moves away from its retaining position to release the mobile flange concerned.

Briefly, in accordance with the invention, this mobile flange is with advantage free to move from one of its extreme positions to the other only when this is necessary.

As a high transmission ratio is not systematically established when idling, there is the advantage of a non-negligible saving in energy.

U.S. Pat. Nos. 3,939,720 and 3,362,242 disclose, in other applications, variable transmission drive systems where associated with the mobile flange of at least one pulley of the system are disengagable retaining means and control means adapted to cause their release.

In this instance the object is to ensure progressive starting up of the driven member, however.

In the unoperated configuration, the variable transmission drive system used to drive this member therefore provides a minimal transmission ratio, the mobile flange of its driving pulley being then in the retracted position. It is in this unoperated retracted position of said mobile flange that the associated disengagable retaining means act, said retaining means necessarily being involved from the outset.

In accordance with the invention, on the other hand, the object is to provide a maximal transmission ratio on starting, and, after variation, to prevent a return to this maximal transmission ratio except under certain conditions.

Other objects and advantages of the invention will appear from the following description of an example of the invention, when considered in connection with the accompanying drawings, and the novel features will be particularly pointed out in the appended claims.

BRIEF DESCRIPTION OF THE DRAWINGS

FIGS. 10 and 11 are views analogous to those of FIGS. 2 and 3, respectively, and relate to another embodiment.

DESCRIPTION OF THE PREFERRED EMBODIMENTS

By way of an example, the drawings show the application of the invention to a variable transmission drive system suitable for automobile vehicles.

Figure 1:
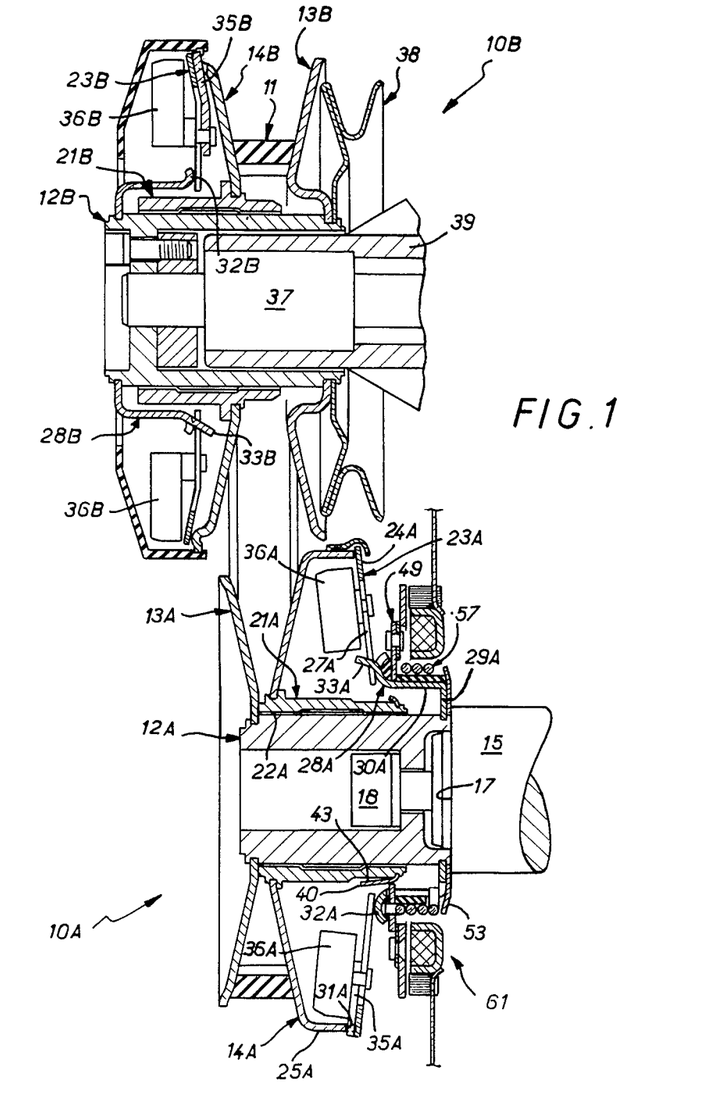
FIG. 1 is an axial cross-section through a variable transmission drive system incorporating a pulley in accordance with the invention, with the mobile flange in the advanced position.

In the embodiment shown, the variable transmission drive system comprises two pulleys 10A, 10B, one of which is driving and the other of which is driven, and a belt 11 of trapezoidal cross-section passing in an endless loop around these pulleys.

Driving pulley 10A generally comprises a rotatable shaft 12A, two flanges 13A, 14A both at least partly frusto-conical on the embodiment shown and keyed to shaft 12A to rotate therewith in a manner to be described in detail hereinafter, and a variable transmission device, in this instance belt 11, disposed axially between the two flanges 13A, 14A in contact with their respective frusto-conical flanks and mounted, for reasons which will emerge hereinafter, so as to be able to move radially relative to said flanges 13A, 14A.

In the embodiment shown, shaft 12A forms a sleeve which, by means of the internal bore in it, is mounted on the end of the output shaft 15 of the motor of the vehicle concerned, being keyed to this shaft to rotate therewith.

Methods for implementing such a mounting are well-known per se and familiar to those skilled in the art. They will not be described in detail herein.

Emphasis will, however, be given to the fact that, in the embodiment shown, the sleeve constituting shaft 12A is axially constrained into bearing contact with a shoulder 17 on shaft 15 by means of a screw 18.

Flange 13A, hereinafter referred to for convenience as the fixed flange, is, at least in use, axially fixed in position relative to the sleeve constituting shaft 12A in the embodiment shown.

For example, and as shown, it may be crimped onto its end.

It is thus directly keyed to shaft 12A so as to rotate therewith.

On the other hand, flange 14A, hereinafter referred to for convenience as the mobile flange, is mounted so as to be axially movable along the sleeve constituting shaft 12A, between two extreme positions, namely an advanced position (FIG. 1) in which it is relatively close to fixed flange 13A and a retracted position (FIG. 5) in which it is relatively distant from fixed flange 13A.

In the embodiment shown, mobile flange 14A is crimped to a bush 21A slidable mounted on the sleeve constituting shaft 12A, an interposed coating 22A favoring its sliding motion thereon.

Axially acting elastic means continuously urge mobile flange 14A towards fixed flange 13A.

In the embodiment shown, these axially acting elastic means comprise an annular member 23A, hereinafter referred to as a diaphragm spring, disposed in the axial direction on the opposite side of mobile flange 14A relative to fixed flange 13A, and having a circumferentially continuous peripheral part 24A forming a Belleville washer, through which it bears axially on mobile flange 14A, more precisely on the edge of an axial lip 25A which the latter has at its periphery, and a central part 27A subdivided into radial fingers by slots, through which it bears axially on a support member 28A.

In the embodiment shown, this support member 28A, which is generally cup-shaped, is attached by crimping its transversal wall or base 29A to the sleeve constituting shaft 12A, at the end thereof opposite fixed flange 13A. It is thus fastened axially.

At the end of its cylindrical side wall 30A it comprises an outwardly projecting rim 32 which is rounded in transverse cross-section, against which diaphragm spring 23A bears axially.

This rounded rim 32A features a number of lugs 33A projecting from it in a substantially axial direction and engaged in the slots in central part 27A of diaphragm spring 23A so as to constrain the latter to rotate with support member 28A and, via same, the sleeve constituting shaft 12A.

Likewise, to constrain mobile flange 14A to rotate with said shaft, diaphragm spring 23A carries radially spaced pads 35A which extend axially and engage axially in notches 31A provided for this purpose in the edge of the axial rim 25A of mobile flange 14A.

Finally, diaphragm spring 23A carries, in the space delimited between it and mobile flange 14A, flyweights 36A responsive to centrifugal force.

In practice, and as shown, pads 35A are associated with certain of the flyweights 36A and are attached to diaphragm spring 23A by the same means as attach to it flyweights 36A.

Pulley 10B is similarly constructed: shaft 12B consisting of a sleeve, fixed flange 13B crimped to the end of this sleeve, mobile flange 14B crimped to a bush 21B mounted to slide on the sleeve, diaphragm spring 23B with pads 35B and flyweights 36B (flyweights 36B being here disposed externally of the space delimited by diaphragm spring 23B and mobile flange 14B), and support member 28B with lugs 33B.

By virtue of the sleeve constituting its shaft 12B, driven pulley 10B is attached to and constrained to rotate with a shaft 37 provided for driving various ancillary devices (not shown).

Furthermore, for the purposes of driving such ancillary devices a grooved pulley 38 is attached by crimping to the sleeve constituting shaft 12B, conjointly with fixed flange 13B, and an intermediate bearing 39 is attached to shaft 37, between the latter and said sleeve.

These arrangements are well-known per se and will not be described in more detail here.

By construction, conditions are such that, in the unoperated condition and as shown in FIG. 1, belt 1 occupies an equilibrium configuration in which it is radially distant from the axis of driving pulley 10A and radially close to the axis of driven pulley 10B.

In other words, in the unoperated condition mobile flange 14A of driving pulley 10A is in the advanced position and mobile flange 14B of driving pulley 10B is in the retracted position.

In practice, the advanced position of mobile flange 14A of driving pulley 10A is defined by the abutment of bush 21A which carries it against the associated fixed flange 13A.

The transmission ratio provided by the variable transmission drive system is then maximum, of the order of 1.3:1, for example.

As soon as the rotation speed of driving shaft 15 reaches a sufficient value, flyweights 36A, 36B come into effect and, by construction, conditions are such that belt 11 moves radially relative to the axis of the assembly and passes progressively from its preceding equilibrium position to an equilibrium position in which it is radially near the axis of driving pulley 12A (FIG. 5) and, conjointly, radially distant from the axis of driven pulley 10B (not shown).

Figure 5:
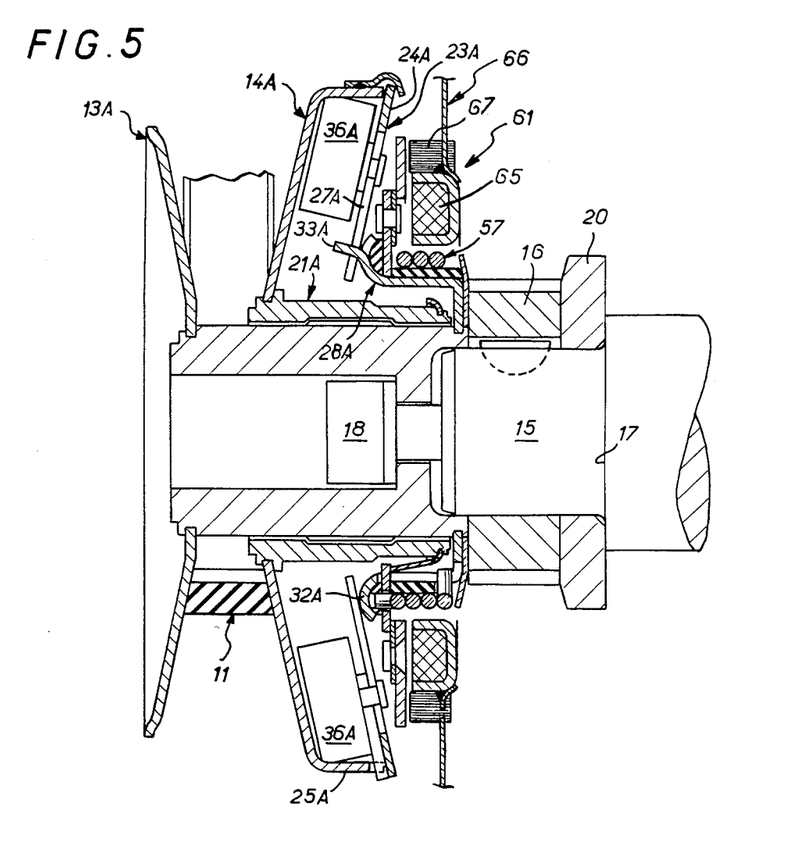
FIGS. 5 and 6 are views analogous to those of FIGS. 2 and 4, respectively, but for the retracted position of the mobile flange of the pulley concerned.

In other words, in this new equilibrium position of belt 11, mobile flange 14A of driving pulley 10A is in the retracted position whereas mobile flange 14B of driven pulley 10B is in the advanced position.

As can be seen in FIG. 5, the retracted position of mobile flange 14A of driving pulley 10A is then defined by abutment of flyweights 36A against axial rim 25A of mobile flange 14A.

The transmission ratio of the variable transmission drive system is then minimum, of the order of 0.6:1, for example.

When the rotation speed of driving shaft 15 decreases, mobile flange 14A of driving pulley 10A returns to its advanced position, under the effect of the force exerted by the associated diaphragm spring 23A. Conjointly, mobile flange 14B of driven pulley 10B returns to the retracted position.

In accordance with the invention, associated with the mobile flange of either of pulleys 10A, 10B are disengagable retaining or locking means adapted to maintain or lock it temporarily in a controlled manner in one of its extreme (advanced or retracted) positions and control means adapted to release it, said retaining means being on the side of the extreme position of said mobile flange opposite that occupied by the latter when unoperated, so that they act only after a first movement of said first flange from one of its extreme positions to the other.

In the embodiment shown, these retaining means are provided for driving pulley 10A, on the side of the retracted position of mobile flange 14A thereof, which corresponds to the lowest transmission ratio of the variable transmission drive system, so that they act only after a first movement of mobile flange 14A from its advanced position to its retracted position.

Figure 2:
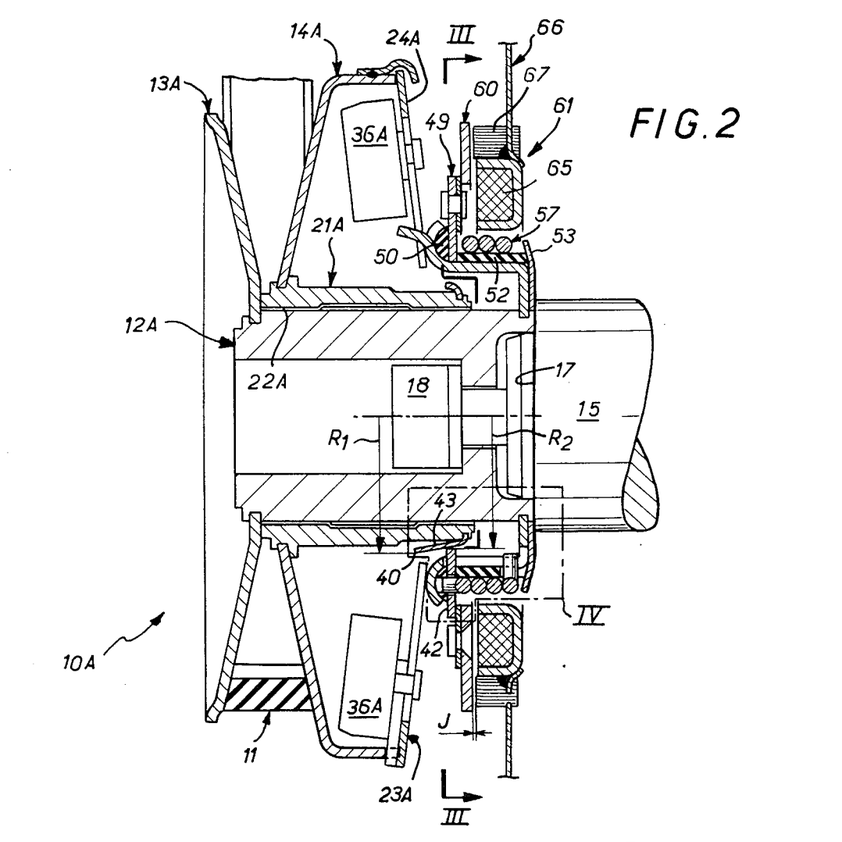
FIG. 2 shows this pulley in isolation to a larger scale.

In accordance with the invention, they generally comprise at least one transverse retaining or locking shoulder 40 formed for this purpose on a member axially fast with mobile flange 14A, and a transverse abutment shoulder 41 formed on a retractable abutment member 42 which is mounted so as to be mobile between a retaining position, in which its transverse abutment shoulder 41 is disposed axially short of said transverse retaining shoulder 40 vis-a-vis the retracted extreme position of mobile flange 14A and so interferes with axial movement of this transverse retaining shoulder 40 when said mobile flange 14A moves from its retracted extreme position to its advanced extreme position, and a release position in which its transverse abutment shoulder 41 is away from said path, said retractable abutment member 42 being acted on by return means which continuously urge it towards its retaining position.

In the embodiment shown in FIGS. 1 to 8, transverse retaining or locking shoulder 40 is formed at the end of an elastically deformable tongue 43 which is axially fast with bush 21A carrying mobile flange 14A and which extends axially and obliquely away from fixed flange 13A, moving away from the axis of the assembly from bush 21A onwards.

In practice, elastically deformable tongue 43 forms part of a cup 45 which, engaged on bush 21A by virtue of an opening 46 in its base 47, is attached to the bush by crimping, at the end of the bush opposite that to which mobile flange 14A is itself attached by crimping.

Furthermore, a plurality of elastically deformable tongues 43, three in the embodiment shown, are in practice provided on cup 45.

These elastically deformable tongues 43 are regularly distributed in the circumferential direction and cooperate with respective abutment members 42, as will be described later.

Thus three abutment members 42 are provided in the embodiment shown.

Each is individually attached to a common supporting disk 49 which is disposed transversely relative to the axis of the assembly, is mounted to rotate about the latter from an abutment extreme position in which it bears circumferentially against a stop, to be described hereinafter, and is acted on by return means, also to be described hereinafter, which urge it continuously in the direction of said abutment extreme position.

In practice, support disk 49 is engaged on support member 28A, around cylindrical side wall 30A thereof, and thus is centered on support member 28A.

In the embodiment shown in FIGS. 1 to 8, it is generally flat and is disposed in the axial direction between two bearings 50, 52 of synthetic material engaged on support member 28A, the first in the concavity of the rounded rim 32A thereof and the second on its cylindrical side wall 30A.

For axial retention of bearing 52 a washer 53 is inserted axially between base 29A of support member 28A and shoulder 17 on shaft 15.

In the embodiment shown in FIGS. 1 to 8, each abutment member 42 is formed by a lug which extends radially towards the axis of the assembly and is attached to support disk 49, being in practice integral therewith and extending away from its inner perimeter.

This lug passes radially through a slot 55 provided for this purpose in support member 28A, more specifically in cylindrical side wall 30A thereof.

In practice, to permit assembly of the device, slot 55 extends axially of support member 28A and is extended by a notch 56 in the base 29A thereof.

Figure 3:
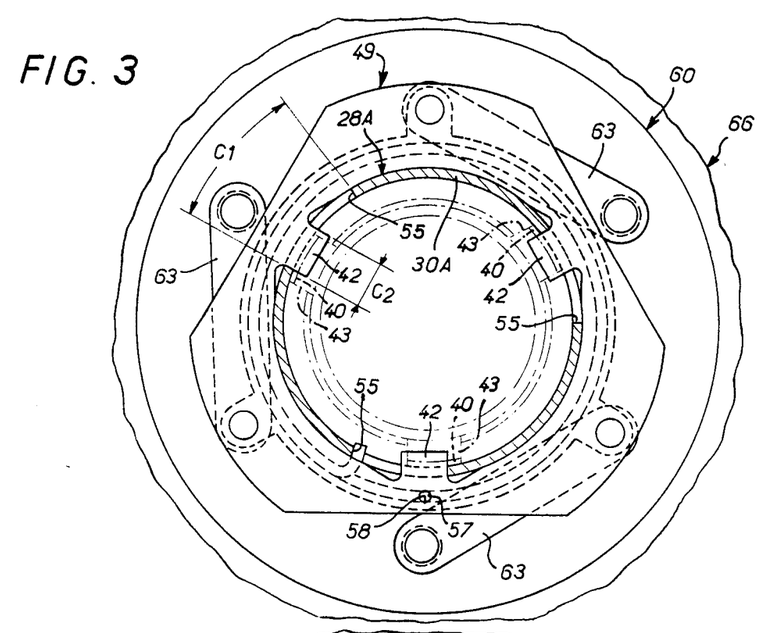
FIG. 3 is a transverse cross-section through this pulley on the line III—III in FIG. 2.
Figure 4:
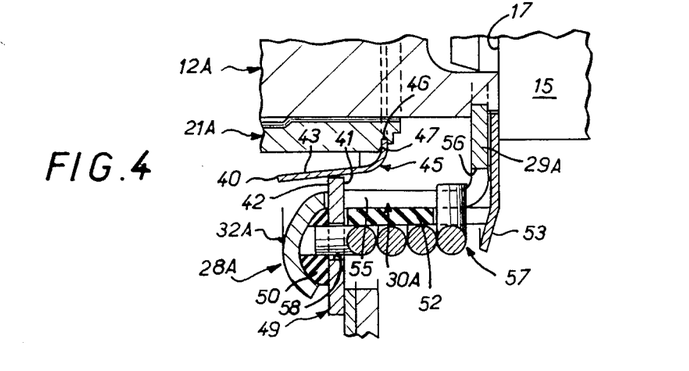
FIG. 4 shows the indicated part of FIG. 2 to a larger scale.

As is more clearly seen in FIG. 3, each slot 55 has a development C1 in the circumferential direction which is greater than that C2 of abutment member 42 which passes through it.

As a result, within limits determined by the circumferential edges of slots 55, support disk 49 for abutment members 42 is capable of rotation around the axis of the assembly.

One of said circumferential edges of slots 55 determines, in the unoperated condition, the abutment extreme position of support disk 49, thus forming the stop against which the latter then bears circumferentially, as mentioned hereinabove.

In the embodiment shown, the elastic means which continuously urge support disk 49 towards this abutment extreme position comprise a torsion spring 57 disposed around bearing 52, one end of which is engaged axially in a hole 58 provided for this purpose in support disk 49, whereas the other, after passing through bearing 52, is engaged radially in one of slots 55 of support member 28A, to bear on the circumferential edge of this groove opposite that defining the abutment extreme position of said support disk 49.

As will emerge hereinafter, torsion spring 57 forms, in the embodiment shown, the return means which continuously urge abutment members 42 towards their retaining position, this corresponding to the abutment extreme position of support disk 49.

By construction, the arrangements are such that, in the unoperated configuration of the assembly, that is to say with mobile flange 14A in the advanced position, the edges of elastically deformable tongues 43 forming transverse retaining shoulder 40 are at a distance R1 from the axis of the assembly exceeding the distance R2 to the edges of the lugs forming abutment members 42 (FIG. 2).

Conjointly, by construction the arrangements are also such that, in the unoperated configuration of the assembly, and as indicated hereinabove, the lugs forming abutment members 42 are axially aligned with elastically deformable tongues 43 (FIG. 3).

The result of this is that, for the unoperated configuration of the assembly, abutment members 42 are in the retaining position and interfere, by virtue of their transverse abutment shoulder 41, with the axial path of movement of transverse retaining shoulder 40 of elastically deformable tongues 43 between the retracted position of mobile flange 14A and its advanced position.

The control means associated in accordance with the invention with the retaining means described hereinabove comprise, in the embodiment shown in FIGS. 1 to 8, a brake disk 60 constrained to rotate with support disk 49 of abutment members 42, associated with which are controlled braking means 61.

In the embodiment shown brake disk 60 is mounted so as to be axially movable relative to support disk 49 of abutment members 42, being coupled to support disk 49 by elastically deformable tongues 63 which, disposed substantially tangential to a circumference of the assembly, extend from support disk 49 to brake disk 60, being attached to these disks at their ends by riveting, for example and as shown.

In the embodiment shown, three elastically deformable tongues 63 as therefore provided between support disk 49 of abutment members 42 and brake disk 60.

Conjointly, in this embodiment, controlled braking means 61 comprise a coil 65 disposed axially facing brake disk 60 and attached for this purpose to a fixed support flange 66, by welding, for example, and a ring 67 of synthetic material, which could be subdivided circumferentially into individual sections, projecting slightly in the axial direction vis-a-vis coil 65 in the direction towards brake disk 60 and itself fixed, being fastened to support flange 66, by virtue of being molded over same, for example.

For the unoperated configuration of the assembly (FIG. 2) there is axial play J between brake disk 60 and ring 67.

Brake disk 60 is of a metallic material responsive to an electromagnetic field. Conjointly, coil 65 is controlled by a unit (not shown) responsive to a defined threshold of a defined characteristic (temperature or pressure, for example) and which, when this threshold is reached, responds by applying to coil 65 an excitation voltage sufficient that, as a result of the electromagnetic field developed by the coil, brake disk 60 is attracted by coil 65 until it comes axially into contact with associated ring 67.

In use, when as described hereinabove mobile flange 14A moves from its advanced position to its retracted position, elastically deformable tongues 43 engage under the respective lugs constituting the corresponding abutment members 42, deforming elastically and progressively until they slide over said lugs.

Resuming then their initial configuration (FIGS. 5 and 6) their edges which together form transverse retaining shoulder 40 bear against transverse abutment shoulder 41 which abutment members 42 conjointly form.

Figure 6:
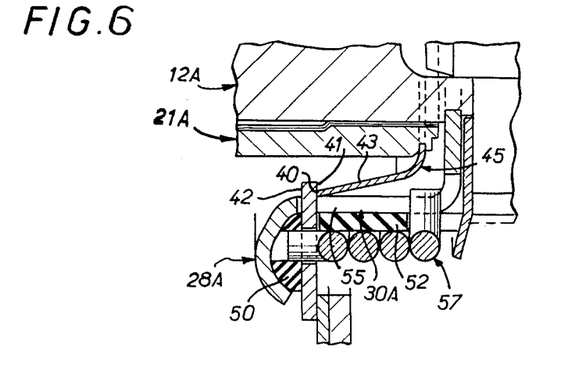

In other words, when mobile flange 14A moves from its advanced position to its retracted position, it systematically clicks into position behind abutment members 42, by virtue of elastically deformable tongues 43 with which it is fast.

It is then mechanically retained in the retracted position, and remains so until an excitation voltage is applied to coil 65 of braking means 61.

Figure 7:
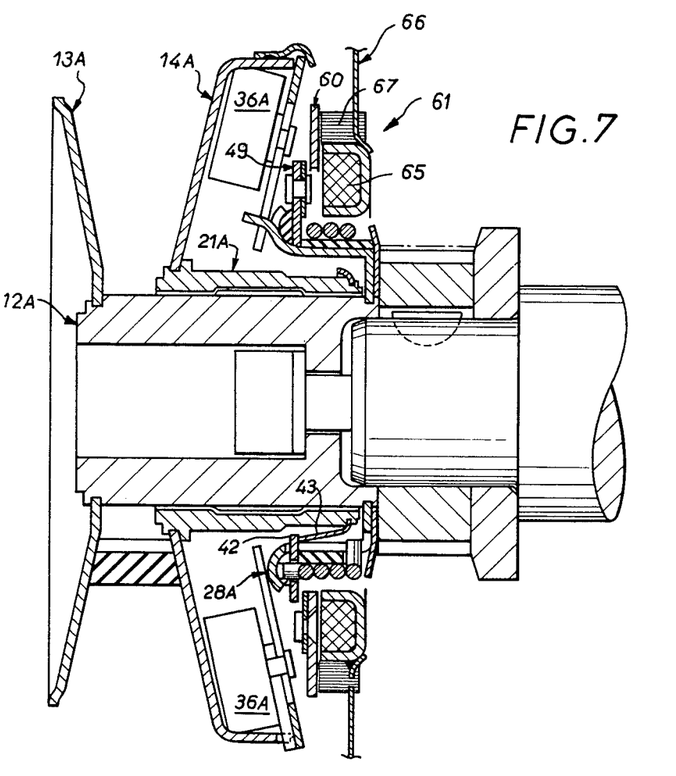
FIG. 7 is a view analogous to that of FIG. 5, showing control of the release of the mobile flange.

When this occurs, and as described hereinabove, brake disk 60 is applied against fixed ring 67 and, braked by the latter, tends to rotate around the axis of the assembly at a speed lower than that of support member 28A.

In other words, it becomes offset angularly relative to the latter.

By virtue of the elastically deformable tongues 63 which enable it to move axially relative to support disk 49 of abutment members 42, it rotates support disk 49, which thus becomes offset relative to support member 28A conjointly with it.

At the end of this displacement (FIG. 8) the lugs constituting abutment members 42 are in the release position, as they are no longer axially aligned with elastically deformable tongues 43, being instead away from the path of axial movement thereof, so that mobile flange 14A is released.

Figure 8:
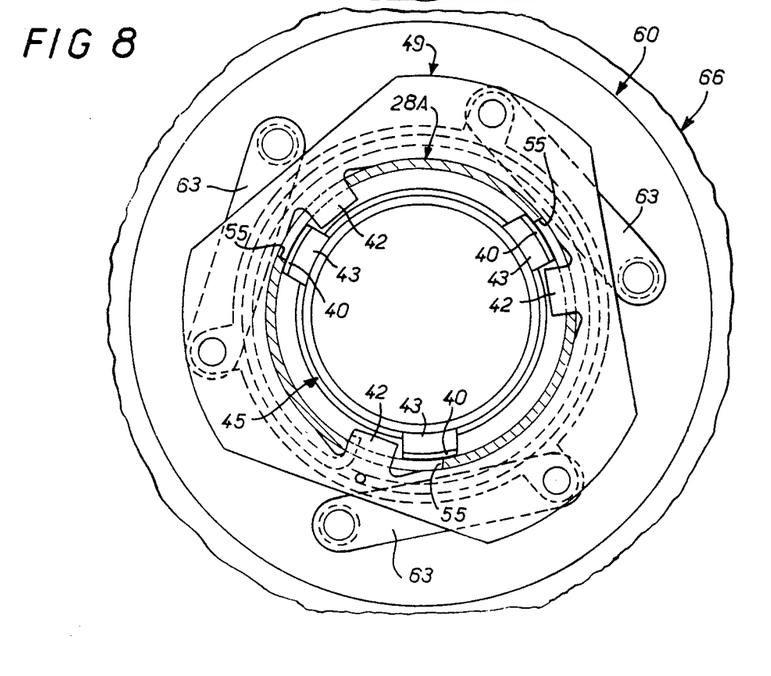
FIG. 8 is a view analogous to that of FIG. 3, showing control of the release of the mobile flange.

Under the effect of the force applied by diaphragm spring 23A, it can then, if necessary, move again towards its advanced position.

It should be noted that when elastically deformable tongues 43 are axially engaged behind the lugs constituting abutment members 42 they bear radially on cylindrical side wall 30A of support member 28A, which prevents them occupying a radially more developed configuration in which they could interfere unnecessarily with return movement of mobile flange 14A to its advanced position.

When coil 65 no longer receives an excitation voltage, brake disk 60 is no longer braked and, under the effect of the force exerted by spring 57, support disk 49 of abutment members 42 returns to its initial abutment extreme position, as defined hereinabove, said abutment members 42 conjointly returning to their retaining position.

The disengagable retaining means in accordance with the invention are then reset for further intervention on the next movement of mobile flange 14A to the retracted position.

In practice, the time for which coil 65 must be subjected to an excitation voltage for the mobile flange to be released is very short.

Also in practice, the excitation voltage may be applied to coil 65 only if the rotation speed of driving shaft 15 is less than that corresponding to the retracted position of mobile flange 14A and if, conjointly, at least one of the driven ancillary devices is subject to an overload.

Likewise, and in order to avoid excessive fatigue affecting the assembly, after an nth excitation by this voltage coil 65 is preferably prevented from responding an (n+1)th time unless the rotation speed of driving shaft 15 has actually exceeded, during the corresponding time interval, the value for which mobile flange 14A is normally in the retracted position.

Figure 9:
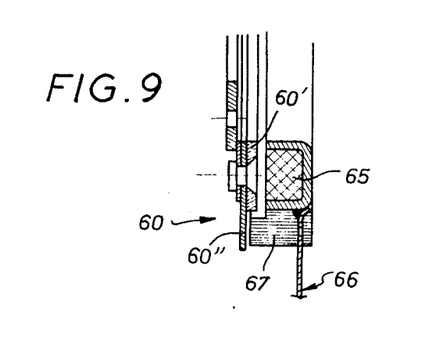
FIG. 9 shows a detail of FIG. 5 and relates to an alternative embodiment.

In the embodiment shown in FIG. 9, brake disk 60 is in two parts 60′, 60″.

Part 60′, which faces coil 65, and this part alone, is in a material able to provide non-remanent closure of the electromagnetic field developed by coil 65, as described hereinabove.

It is of mild steel, for example.

Part 60″, which extends opposite fixed ring 67, is preferably of steel processed to withstand the friction developed on contact with ring 67.

Thus there is an advantageous dissociation of the magnetic and mechanical functions of brake disk 60.

In the foregoing description, abutment members 42 are in the form of radial tongues which move circumferentially on passing from their retaining position to their release position.

Figure 10:
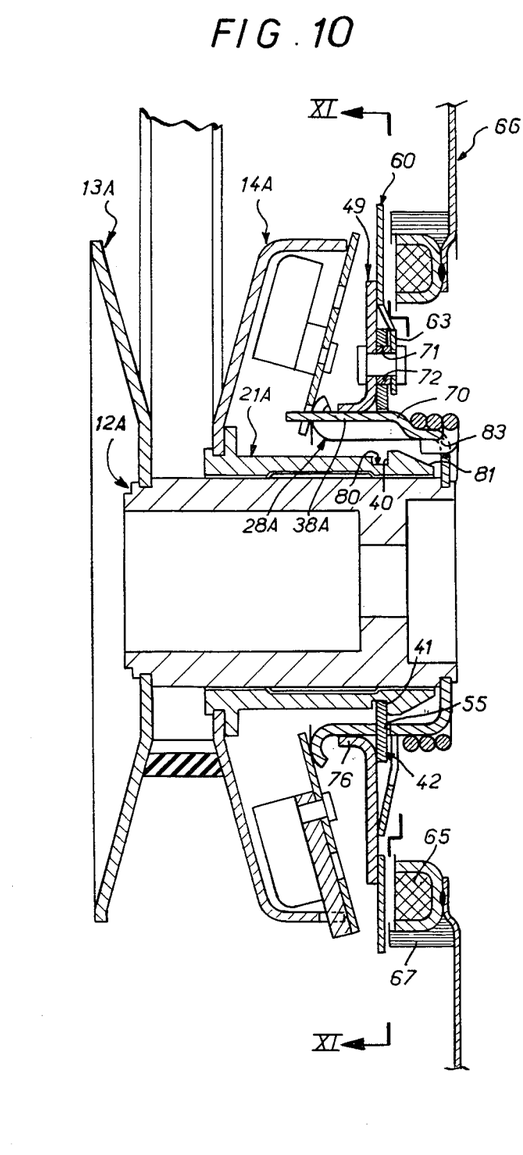
Figure 11:
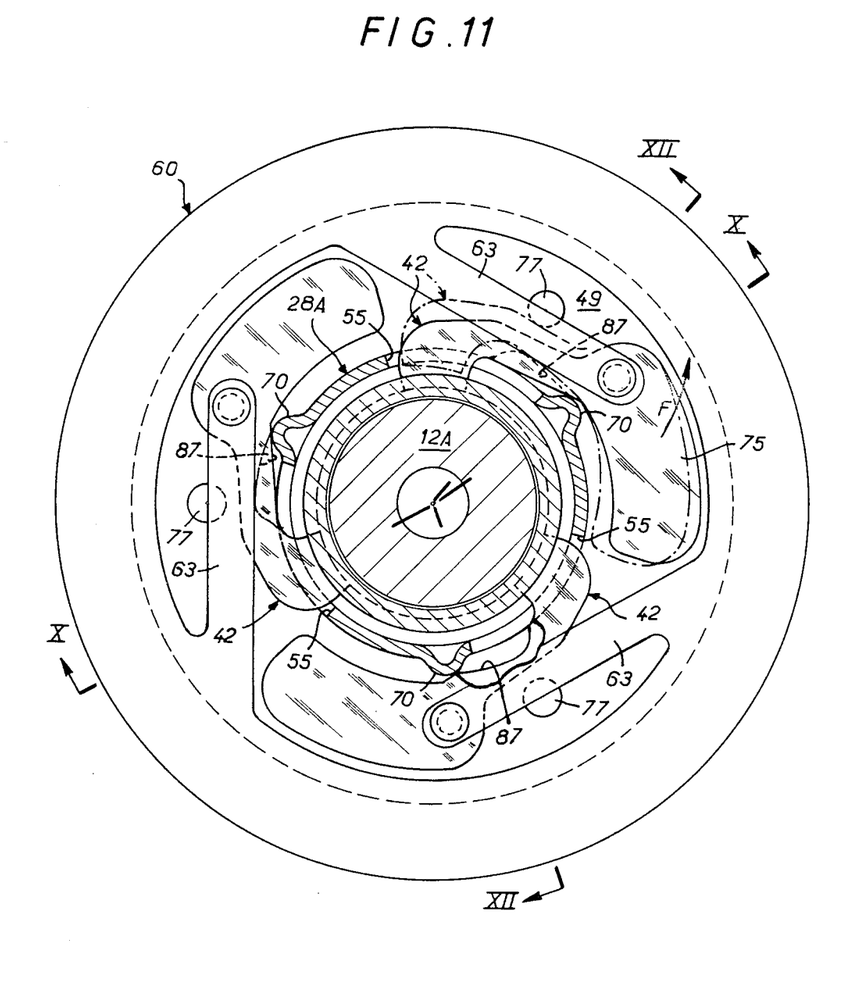
Figure 12:
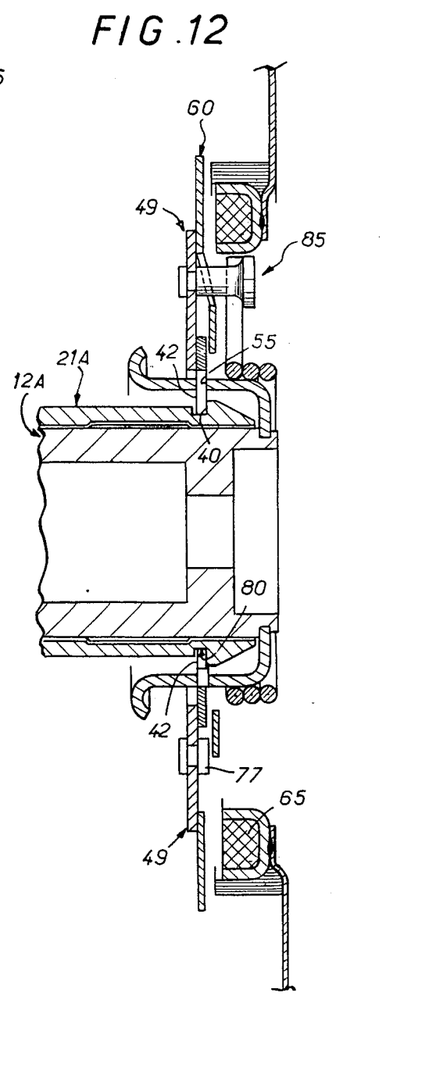
FIG. 12 is an axial cross-section through this embodiment on the line XII—XII in FIG. 11.

In the embodiment shown in FIGS. 10 to 12, they are displaced radially on such movement.

In this embodiment, each abutment member 42 is a lever mounted so as to pivot on support disk 49 about an axis parallel to the axis of the assembly and there is associated with it a cam 70 adapted to move it from its retaining position to its release position when, as previously, support disk 49 moves away from the unoperated abutment extreme position.

In practice, in this embodiment each abutment member 42 is engaged rotatably, by means of an opening 71 and interposed washer 72, on the shaft of the rivet fastening the corresponding elastically deformable tongue 63 to support disk 49.

Conjointly, cam 70 associated with it is formed by an axial projection on support member 28A, or more precisely on cylindrical side wall 30A thereof, this projection being obtained, for example, by appropriately stamping said cylindrical wall 30A.

In the embodiment shown, the return means associated with each abutment member 42 consist of a flyweight 75 responsive to centrifugal force and with which it is fast. As an alternative variant, they may consist of elastic means.

In practice, in this embodiment the lever constituting an abutment member 42 and the flyweight 75 associated therewith are integral with one another, being obtained by appropriately cutting a common blank, for example (FIG. 11).

The edge of this lever bears on the associated cam 70.

As previously, each abutment member 42 is continuously engaged in the radial direction in a slot 55 in support member 28A, but this extends transversely.

In other words, its axial development is limited to that needed to provide for the passage, with clearance, of an abutment member 42.

In practice, with each abutment 42 there is associated a stop 77 able to limit its pivotal movement and so to define in a positive manner the release position, as shown schematically in dashed outline in FIG. 11.

As shown, this stop consists of a rivet fastened for this purpose to support disk 49.

The position of stop 77 is such that, in its release position, abutment member 42 is still engaged in slot 55 in support member 28A.

Axial retention of support disk 49 is thus effected by abutment members 42 alone, and there is no need in this case to provide bearings on either side of support disk 49 to achieve such axial retention.

In the embodiment shown, however, support disk 49 comprises on its internal periphery and for centering it on support member 28A an axial rim forming a bearing 76, with which it is therefore fast and through which it is engaged on said support member 28A.

Moreover, in the embodiment shown in FIGS. 10 to 12, transverse retaining or locking shoulder 40 with which abutment members 42 must cooperate is formed by one flank of a groove formed annularly, in circumferentially continuous manner, on bush 21A carrying mobile flange 14A. On the side of this bush opposite mobile flange 14A groove 80 is preceded by a frustoconical engagement bearing surface 81.

Finally, in the embodiment shown in FIGS. 10 to 12, elastically deformable tongues 63 coupling brake disk 60 to support disk 49 are integral with brake disk 60 and one end of spring 57 forming the return means associated with support disk 49 is engaged axially in a bore 83 provided for this purpose in support member 28A, more precisely in the base 29A thereof. Its other end bears on a peg 85 fastened for this purpose to support disk 49, between brake disk 60 and one of elastically deformable tongues 63 coupling support disk 49 and brake disk 60.

In practice and by construction, the arrangements are such that, under the effects of centrifugal force acting on flyweights 75 and causing them to rotate away from the axis of the assembly, as shown by the arrow F in FIG. 11, abutment members 42 are systematically in the retaining position, as shown in FIG. 11, before mobile flange 14A arrives at the retracted position.

Subsequently, when it arrives at the retracted position, bush 21A carrying mobile flange 14A systematically engages on abutment members 42, through that flank of groove 80 constituting transverse retaining shoulder 40 provided for this purpose. Abutment members 42 have previously been moved temporarily away from their retaining position by the associated frustoconical engagement bearing surface 81.

From this time on, as previously, abutment members 42 retain mobile flange 14A in the retracted position, by virtue of transverse abutment shoulder 41.

However, when an excitation voltage is applied to coil 65 and, according to the process previously described, brake disk 60 is thus braked, support disk 49 carrying abutment members 42 moves away from its abutment extreme position and entrains with it abutment members 42 which, acted on by associated cams 70, in turn move away from their retaining position, towards their release position, which releases mobile flange 14A.

In practice, to permit the passage of cams 70 which project from bearing member 28A, support disk 49 has on its internal periphery cut-outs 87 which are elongated circumferentially and against the circumferential ends of which located opposite abutment members 42 support disk 49 bears in the circumferential direction when in the abutment extreme position, to define said abutment extreme position of support disk 49.

Thanks to this advantageous arrangement, the abutment extreme position of support disk 49 is not defined by abutment members 42.

Figure 13:
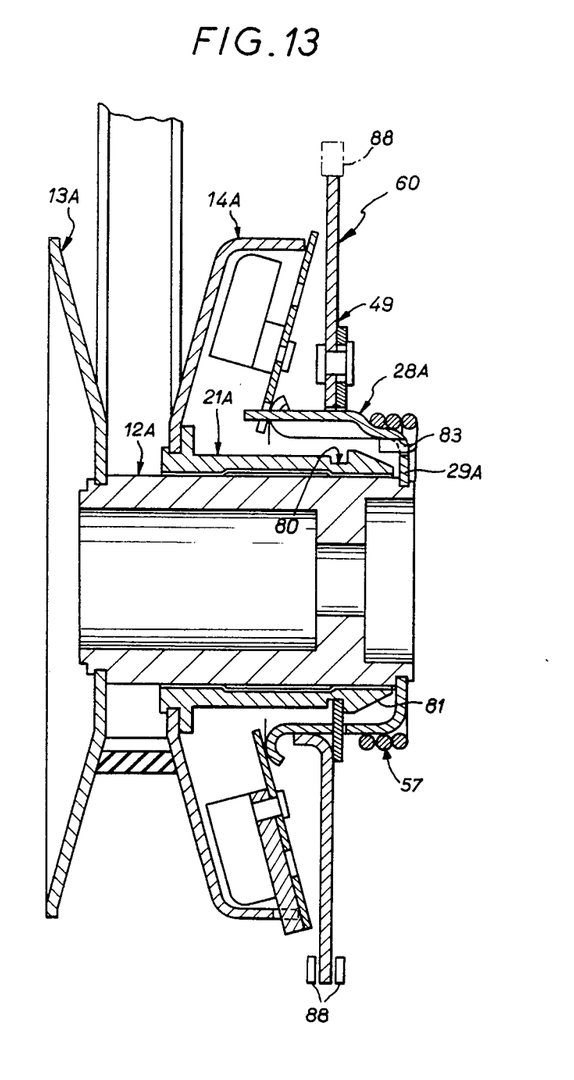
FIG. 13 is a view analogous to that of FIG. 10 and concerns a further embodiment.

In the embodiment shown in FIG. 13, brake disk 60 and support disk 49 are one and the same, the combination being formed from a common blank the central part of which forms support disk 49 and the peripheral part of which forms brake disk 60.

In this variant, and as shown in the bottom part of FIG. 13, the associated braking means may comprise two brake pads 88 disposed one on each side of brake disk 60, these brake pads being, in a manner known per se, acted on by appropriate control means so as to apply them against brake disk 60 in a controlled manner.

As a variant and as shown schematically in dashed outline in the upper part of FIG. 13, a single brake pad 88 may be provided, acting on the edge of brake disk 60.

It will be understood that various changes in the details, materials and arrangements of parts, which have been herein described and illustrated in order to explain the nature of the invention, may be made by those skilled in the art within the principle and scope of the invention as expressed in the appended claims.

In particular, both flanges of the pulley may be mounted axially mobile along the shaft of the pulley and/or not comprise frusto-conical flanks.

Also, rather than being applied to the driving pulley of a variable transmission drive system, the present invention could equally well be applied to the driven pulley thereof and/or to the advanced position of the mobile flange of either of these pulleys rather than to the retracted position of the mobile flange.

Finally, the application of the invention is not limited to variable transmission drive systems or variable transmission drive systems for automobile vehicles, being more generally applicable to all pulley assemblies comprising a flange mobile relative to a fixed flange and a variable transmission device between the two flanges.

It is claimed:

1. A pulley assembly suitable for use in a variable transmission drive system for an automobile vehicle, said pulley assembly comprising a rotatable shaft, two flanges keyed to said shaft so as to rotate therewith, at least a first of said flanges being mounted so as to move axially relative to said shaft between two extreme positions, namely a retracted position and an advanced position, a varaiable transmission device disposed axially between and in contact with said flanges and being movable radially relative to said flanges, said first flange being in a first of said extreme positions when said first flange is inoperative, releasable locking means associated with said first flange for locking said first flange temporarily in a second of said extreme positions, said locking means being automatically operable to lock said first flange in said second extreme position in response to predetermined movement of said first flange from said first extreme position to said second extreme position, and control means associated with said first flange for releasing said locking means.

2. A pulley assembly according to claim 1, wherein said shaft is a driving shaft, and said first extreme position is said advanced position and said second extreme position is said retracted position of said first flange.

3. A pulley assembly according to claim 1, wherein said lock means are at said extreme position of said first flange corresponding to the lowest transmission ratio.

4. A pulley assembly according to claim 1, wherein said locking means comprise at least one transverse retaining shoulder fixed for axial movement with said first flange, and a retractable abutment member having a transverse abutment shoulder and being movably mounted, said transverse retaining shoulder being axially spaced from said transverse abutment shoulder when said first flange is in said first extreme position, said retractable abutment member having a locking position in which the transverse abutment shoulder is in the path of movement of said transverse retaining shoulder during displacement of said first flange from said first extreme position to said second extreme position, said retractable abutment member having a release position in which said transverse abutment shoulder is out of the path of movement of said transverse retaining shoulder, and return means constantly urging said retractable abutment member to said locking position.

5. A pulley assembly according to claim 4, further comprising a bush carrying said first flange and an elastically deformable tongue constrained to move axially with said bush, said transverse retaining shoulder being formed at an end of said elastically deformable tongue.

6. A pulley assembly according to claim 5, wherein said elastically deforable tongue extends obliquely towards said second flange and away from the axis of the assembly from said bush carrying said first flange.

7. A pulley assembly according to claim 5, further comprising a cut having an opening for receiving said cup on said bush, and said cup being crimped to said bush, said elastically deformable tongue forming part of said cup.

8. A pulley assembly according to claim 5, comprising a plurality of said elastically deformable tongues and an equal number of said retractable abutment members, said elastically deformable tongues being regularly circumferentially spaced, and each of said elastically deformable tongues being cooperable with a respective one of said retractable abutment members.

9. A pulley assembly according to claim 4, comprising an annular groove in a bush carrying said first flange, said annular groove having flanks, said transverse retaining shoulder being formed by one of the flanks of said annular groove.

10. A pulley assembly according to claim 9, comprising a frusto-conical engagement bearing surface on said bush carrying said first flange, forwardly of said groove.

11. A pulley assembly according to claim 4, comprising a support disk disposed transversely relative to the axis of said pulley assembly and rotatable about said axis, a stop, and return means urging said support disk constantly towards an abutment extreme position in which it bears circumferentially against said stop, said abutment member being fast with said support disk.

12. A pulley assembly according to claim 11, comprising a diaphragm spring and a support member which is immovable in the axial direction and on which said diaphragm spring bears, said support disk of said abutment member being engaged on said support member and centered on same and said first flange being urged towards the second flange by said diaphragm spring.

13. A pulley assembly according to claim 12, comprising two bearings of synthetic material engaged on said support member, said support disk of said abutment member being disposed axially between said two bearings.

14. A pulley assembly according to claim 12, comprising a bearings to which said support disk of said abutment member is attached and through which it is engaged upon said support member.

15. A pulley assembly according to claim 13, comprising a slot in said bearing member in which said abutment member is permanently engaged.

16. A pulley assembly according to claim 13, wherein said abutment member comprises a lug extending radially towards the axis of said pulley assembly and fastened to said support disk.

17. A pulley assembly according to claim 16, wherein said lug forming said abutment member is integral with said support disk.

18. A pulley assembly according to claim 15, wherein said slot in said support member extends axially.

19. A pulley assembly according to claim 17, wherein said return means for said abutment member are formed by said return means for said support disk.

20. A pulley assembly according to claim 11, comprising a lever mounted to pivot on said support disk around an axis parallel to the axis of the pulley assembly and constituting said abutment member, and associated therewith a cam adapted to displace it from its retaining position to its release position when said support disk moves away from its abutment extreme position.

21. A pulley assembly according to claim 12, comprising a lever mounted to pivot on said support disk around an axis parallel to the axis of the pulley assembly and constituting said abutment member, and associated therewith a cam adapted to displace it from its retaining position to its release position when said support disk moves away from its abutment extreme position, said pulley assembly further comprising a projection on said support member forming said cam.

22. A pulley assembly according to claim 20, comprising a flyweight responsive to centrifugal force and constituting said return means of said abutment member.

23. A pulley assembly according to claim 20, comprising elastic means constituting said return means of said abutment member.

24. A pulley assembly according to claim 15, wherein said slot in said support member extends transversely.

25. A pulley assembly according to claim 4, comprising a plurality of abutment members which are regularly circumferentially spaced.

26. A pulley assembly according to claim 11, comprising a brake disk with which said support disk of said abutment member is constrained to rotate and controlled braking means associated therewith, said brake disk constituting part of said control means associated with said retaining means.

27. A pulley assembly according to claim 26, wherein said brake disk is mobile axially relative to said support disk of said abutment member and further comprising elastically deformable tongues connecting said brake disk to said support disk.

28. A pulley assembly according to claim 27, wherein said support disk of said abutment member constitutes said brake disk.

* * * * *